United States Patent [19]
Lee et al.

[11] Patent Number: 5,913,890
[45] Date of Patent: Jun. 22, 1999

[54] AIR CURRENT CONTROL APPARATUS FOR AIR CONDITIONER AND METHODS

[75] Inventors: Gab-Youl Lee, Suwon; Yong-Woong Bang, Sungnam, both of Rep. of Korea

[73] Assignee: Samsung Electronics, Co., Ltd., Suwon, Rep. of Korea

[21] Appl. No.: 08/909,087

[22] Filed: Aug. 12, 1997

[30] Foreign Application Priority Data

Sep. 12, 1996 [KR] Rep. of Korea ............ 96-39519
Sep. 12, 1996 [KR] Rep. of Korea ............ 96-39523
Sep. 12, 1996 [KR] Rep. of Korea ............ 96-39524

[51] Int. Cl.⁶ ........................... F25D 17/06
[52] U.S. Cl. .................. 62/186; 454/313; 236/49.3
[58] Field of Search ............ 236/49.3, 94; 454/256, 454/315, 313; 62/186, 89

[56] References Cited

U.S. PATENT DOCUMENTS

4,978,061  12/1990  Ogihara et al. ............ 236/49.3
5,180,333  1/1993  Shyu ............................ 236/49.3 X
5,385,031  1/1995  Kizawa et al. ............... 62/186
5,505,378  4/1996  Park ............................ 236/49.3 X

*Primary Examiner*—Denise L. Ferensic
*Assistant Examiner*—Susanne C. Tinker
*Attorney, Agent, or Firm*—Burns, Doane, Swecker & Mathis, L.L.P.

[57] ABSTRACT

This invention relates to an air flow control apparatus for an air conditioner for implementing the air conditioning of the entire room by controlling air flow direction and preset temperature, the apparatus including an operation manipulating unit for manipulating keys so as to supply the discharging air to any selected places to be air conditioned, an control unit for controlling flow direction, flow rate and preset temperature of the discharging air to supply the air to the places in response to the selected keys, a unit to adjust air flow direction of the discharging air in order to control angles of the blades in response to the control unit, and a compressor driving unit for driving a compressor so as to adjust room temperature with the preset temperature by the control unit.

1 Claim, 12 Drawing Sheets

AIR CURRENT CONTROL APPARATUS FOR AIR CONDITIONER AND METHODS

BACKGROUND OF THE INVENTION

1. Field of the Invention

The present invention relates to discharging air current control methods and apparatus for a room air conditioner.

2. Description of the Prior Art

Figure 1:
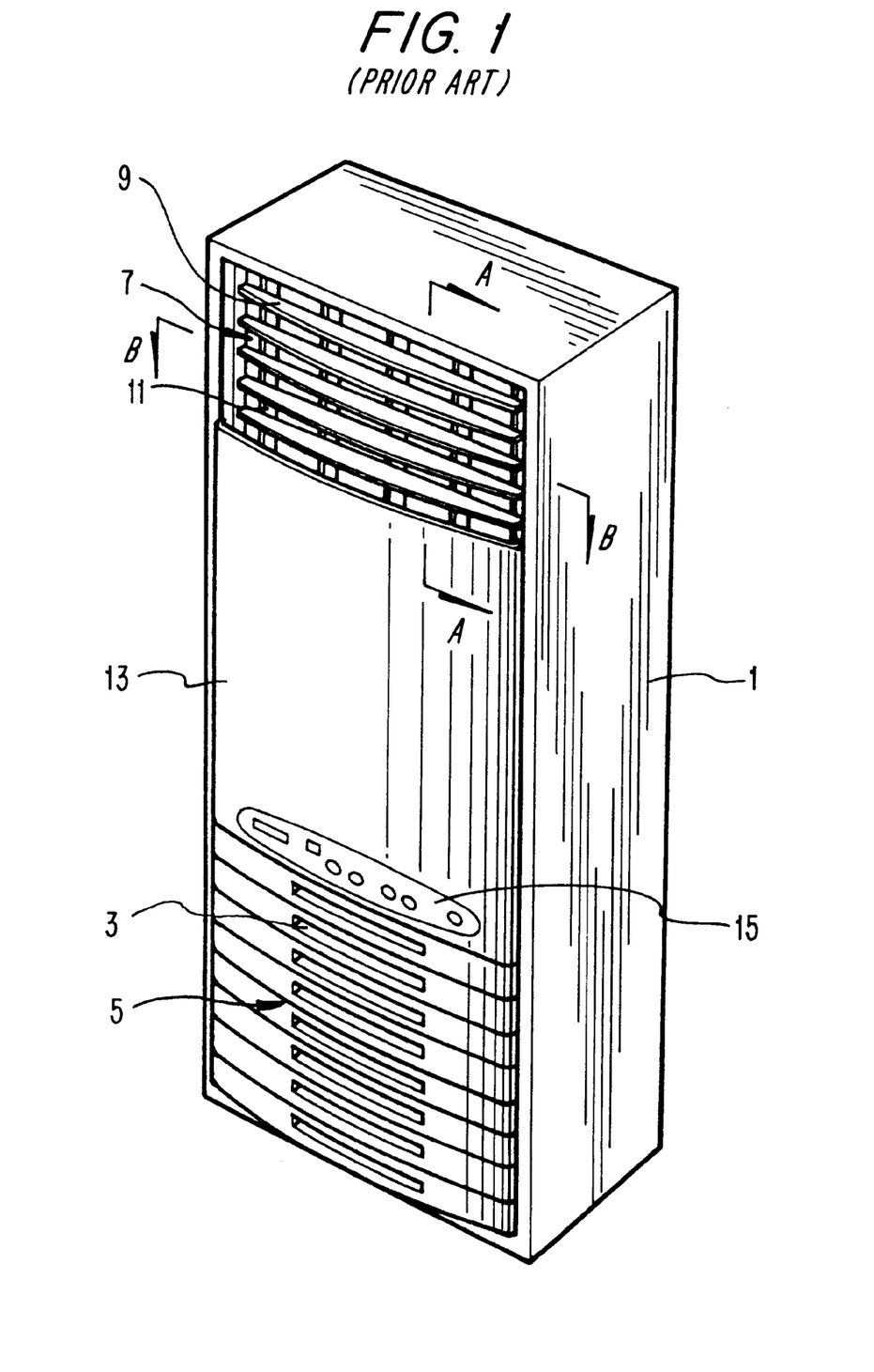
FIG. 1 is a perspective view of a conventional air conditioner.

A conventional air conditioner has, as shown in FIG. 1, a suction grille member 5 provided at a front lower portion of the main body 1 including suction inlets 3 for admitting room air, and a discharge outlet 7 for discharging indoors the air heat-exchanged (warmed or cooled) by a heat-exchanger, the outlet 7 disposed at a front upper portion of the body 1.

Vertical and horizontal sets of blades 11 and 9 extend across the discharge outlet 7 for use in adjusting the respective vertical and horizontal directions in which the heat-exchanged air is discharged indoors through the discharge outlet 7. A cover member 13 attached to the front surface of the body 1 is used in protecting the interior of the body 1 ad is usually designed to give a good appearance thereto. In a lower area of the cover member 13 is disposed a manipulating portion in the form of a control panel 15 for selecting desired operation modes of the air conditioner such as automatic mode, cooing, heating, defrost, air-cleaning, and so forth, and a start/stop of the air conditioner, and also for adjusting the amount or flow directions of the air discharged through the discharge outlet 7.

Figure 2:
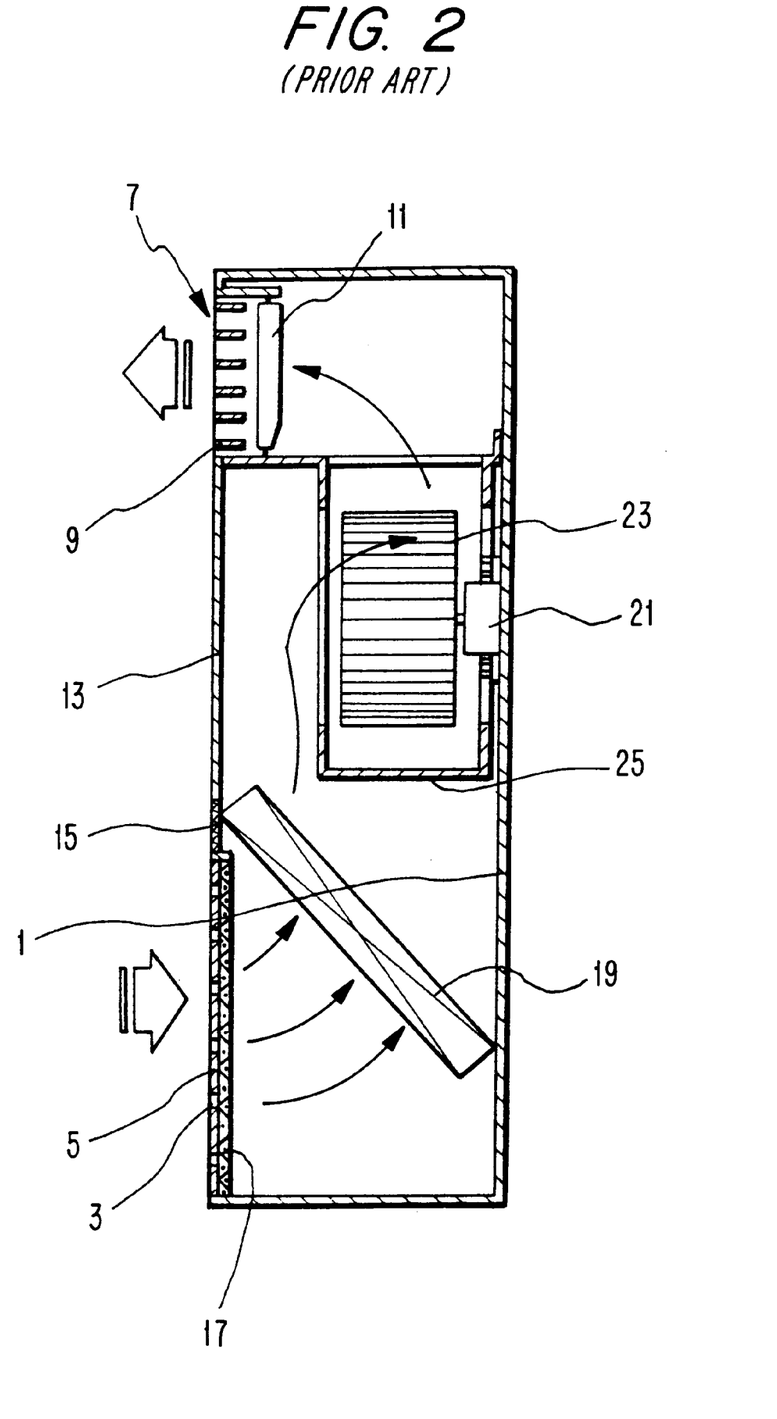
FIG. 2 is a vertical sectional view of the conventional air conditioner.

As shown in FIG. 2, filter member 17 is installed adjacent an inner side of the suction grille member 5 for filtering-out foreign substances contained in the room air, and an oblong-shaped heat exchanger 19 is provided downstream of the filter member 17 such that the room air from the filter member 17 is thermally exchanged with cold or warm refrigerant by the evaporation latent heat of the refrigerant.

Over the heat exchanger 19 is disposed a blower fan 23 (hereinafter also referred to as an indoor fan) which is rotated in response to the driving of an indoor fan motor 21, for sucking the room air through the suction inlet 3 and also discharging indoors the heat-exchanged air through the discharging outlet 7. Around the indoor fan 23 is installed a duct member 25 to guide the air flow from the suction inlet 3 to the discharge outlet 7 and also to serve as a protection for the indoor fan 23.

In the conventional air conditioner thus constructed, if a user selects a desired operational mode through either a remote controller or the operation manipulating portion 15, and then depresses a operation key, the indoor fan 23 is rotated such that the room air is sucked the body 1 through the suction inlet The sucked air passes trough the filter member 17 for filtering-out any foreign substances such as dust entrained in the room air. The cleaned air is then heat-exchanged by the evaporating latent heat of the refrigerant flowing in the heat-exchanger 19 when the sucked air passes across the heat-exchanger 19.

The air heat-exchanged by the heat-exchanger 19 is guided into an upper portion of the body 1 by the duct member 25 and then discharged indoors through the discharge outlet 7 in a direction determined according to adjustments of the vertical and horizontal blades 11, 9, for accomplishing the conditioning of the room air.

In controlling the vertical and horizontal flow directions established by the vertical and horizontal blades 11, 9 the position of horizontal blades 9 is adjusted each time a key on the operation manipulating portion 15 is actuated, and the blades 9 are not moved any longer when the key is turned off. Similarly, the position of the vertical blades 11 is varied each time another key is actuated, and the blades 11 are not moved any longer when that key is turned off.

However, this manipulations is inconvenient in that a user has to visually confirm the respective positions of both sets of blades 9, 11 to verify that a desired pattern of an air current has been set. Furthermore, there are problems in that the air is discharged only in directions which are vertically or horizontally set, depending upon the given angles of the blades 9, 11, resulting in a somewhat narrow range of air flow, and further, an air speed and distance to which the discharged air can be delivered cannot be easily controlled.

Further, to condition the entire room, it is necessary to re-adjust the angles of the blades 9, 11 at predetermined time intervals, and in order to air condition remote areas of the room an increase in the speed of the discharging air may be needed. This burdens a user with the need for making periodic adjustments of the air blowing direction, as well as the air speed.

Further, there is problem in that an concentrated delivery of the discharging air cannot be performed to a specific place to be air conditioned, because vertical blades 11 only are horizontally set.

SUMMARY OF THE INVENTION

Therefore, it is an object of the present invention to provide an air flow control methods and apparatus, by which an improved convenience for use of the air conditioner is provided in that the direction, flow rate and preset temperature of discharged air can be set to provide various patterns of an air current, so that an air-conditioning throughout the room can be made, and a comfortable environment can be provided.

The above object can be accomplished by an air flow control apparatus for an air conditioner having a suction inlet for sucking room air, a heat exchanger for exchanging heat with the air, a discharging outlet for discharging the heat-exchanged air into the room, air directing blades for controlling a flow direction of the air being discharged, and an indoor fan for flow rate of the discharging air, the apparatus comprising:

operation manipulating means for manipulating keys so as to supply the discharging air to any selected places to be air conditioned;

control means for controlling flow direction, flow rate and preset temperature of the discharging air to supply the air to said places in response to the selected keys;

means for adjusting air flow direction of the discharging air, the means controlling angles of the blades in response to the control means; and compressor driving means for driving a compressor so as to adjust room temperature with the preset temperature by the control means.

Another aspect of the present invention, there is provided A method of controlling a flow direction of air discharged from an air outlet of an air conditioner into a room, comprising the steps of:

determining which mode of the near, wide and distant distances operations is selected;

controlling a flow direction of the discharged air by controlling angles of blades according to operation mode determined by said decision step;

controlling flow rate of the discharged air by controlling a speed of an indoor fan according to the determined operation mode;

controlling the preset temperature based upon a reference temperature calculated according to said determined operation mode; and air conditioning by driving a compressor with reference to the difference between the preset temperature and room temperature.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENT

The preferred embodiment according to the present invention will now be described in detail in accordance with the accompanying drawings.

Throughout the accompanying drawings, like parts are designated by like reference numerals or symbols.

Figure 3:
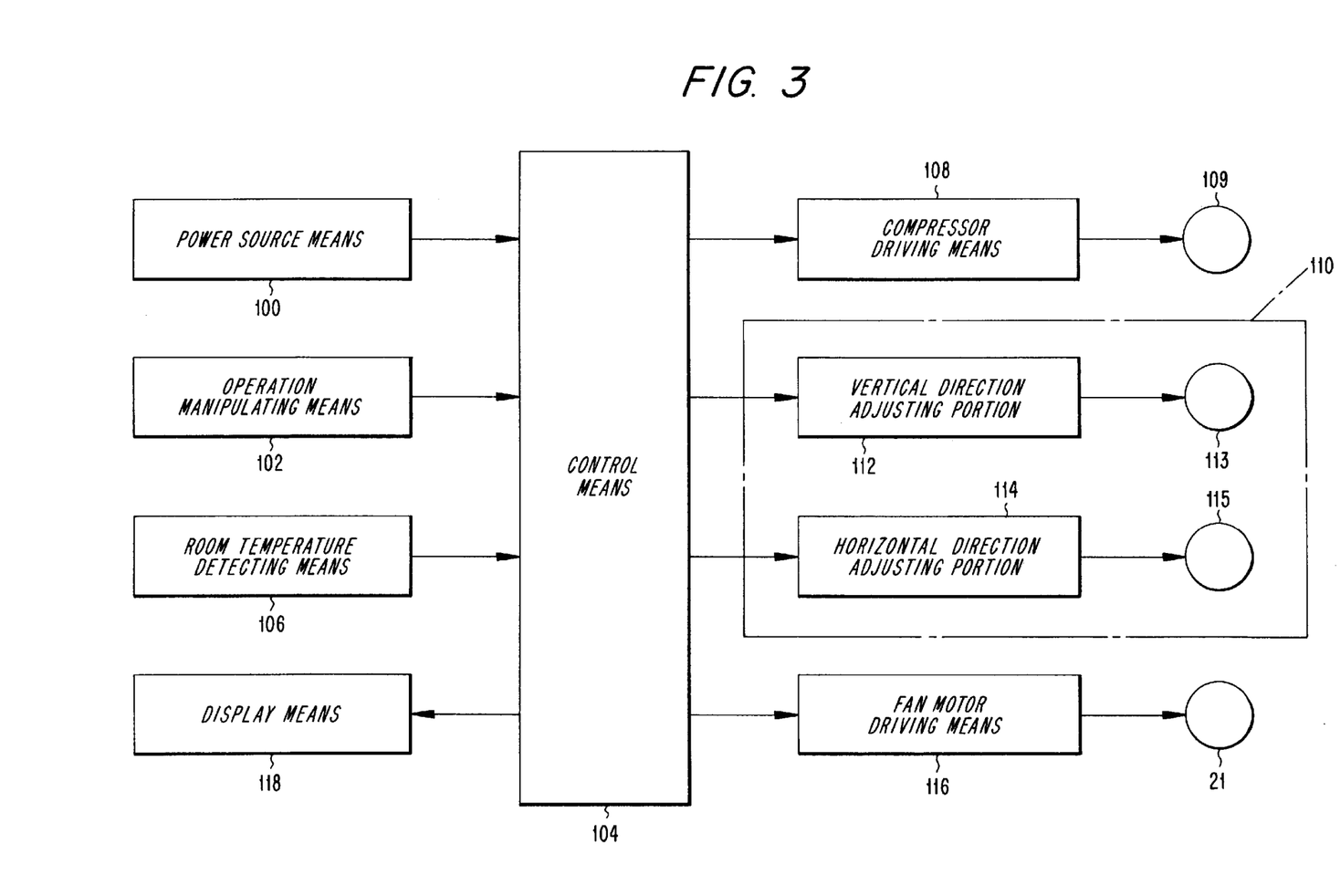
FIG. 3 is a control block diagram of a discharging air current apparatus for controlling the air conditioner according to the present invention.

As shown in FIG. 3, power supply means 100 receiving a commercial AC voltage fed from an AC source converts the AC voltage into a predetermined level of a DC voltage required to activate the air conditioner, and outputs the DC voltage. Operation manipulating means 102 is provided with many function keys for directing the desired operation modes of the air conditioner depicted in FIGS. 1 and 2 such as automatic mode, cooling, heating, defrost, air-cleaning, and so forth, and a start/stop of the air conditioner, as well as for setting a desired temperature of the room and/ or flow directions an flow rate of the air to be discharged. The operation manipulation means 102 has a focus key (or, near distance key), a wide key, and a zoom key (or distant distance key).

Control means 104 receives a DC voltage supplied from the power supply means 100 and initializes the air conditioner operation. The control means 104 substantially comprises a microcomputer for controlling the general operations of the air conditioner in compliance with the selected operations and start/stop signals which are input at the operation manipulating means 102. This control means 104 controls the air blowing angles of the blades 9, 11, and the revolution speed of the indoor fan 23 and a set temperature Ts so as to result in the selective supply of the heat-exchanged air to an entire room, distant areas, or near areas.

Room temperature detecting means 16 senses a temperature Tr of room air sucked through the suction inlet 3 to conduct the air-conditioning operation in compliance with the temperature Ts set by a user. Compressor driving means 108 receives a control signal output from the control means 104 in response to the difference between the temperatures Ts and Tr, and drives a compressor 109.

Air blowing direction adjusting means 110 is provided for adjusting the discharged air flow direction so as to result in the supply of the heat-exchanged air to an overall room, distant or near areas, in response to inputs at the operation manipulating means 102. This air blowing direction adjusting portion 110 includes a vertical direction adjusting portion 112 which receives a control signal from the control means 104 and drives a vertical direction driving motor 125 to rotate the blades 9 vertically, i.e., up or down, and a horizontal direction adjusting portion 114 which receives a control signal from the control means 104 and drives a horizontal direction driving motor 115 to rotate the blades 11 horizontally, i.e., right or left.

Fan motor driving means 116 is provided for controlling the amount of discharged air flow so as to result in the supply of the heat-exchanged air to an overall room, distant areas or wide regions (medium and remote distances). Thus, the means 116 controls the revolution speed of the indoor fan motor 21 to drive the fan 23 in response to a control signal from the control means 104, for the purpose of blowing indoors the heat-exchanged air in compliance with an air blowing amount selected by the operation manipulating means 102.

Display means 118 receives a control signal which is output from the control means 116 in response to a key input signal from the operation manipulation means 102, and then displays the selected operation mode of the air conditioner such as automatic mode, cooling, heating, defrost, air-cleaning, and so forth, and the set temperature and the sensed temperature. Further, the display means 118 turns on or off a near distance indicating lamp representing a near-distance operation mode for conditioning near areas (focus mode), a wide mode indicating lamp for a wide operation condition (wide mode), and a distant distance indicating lamp representing a distant operation condition for conditioning the distant region of the room (zoom mode).

The operation and advantages of an air current controlling apparatus for an air conditioner, and a method associated therewith will be discussed below.

Figure 4A:
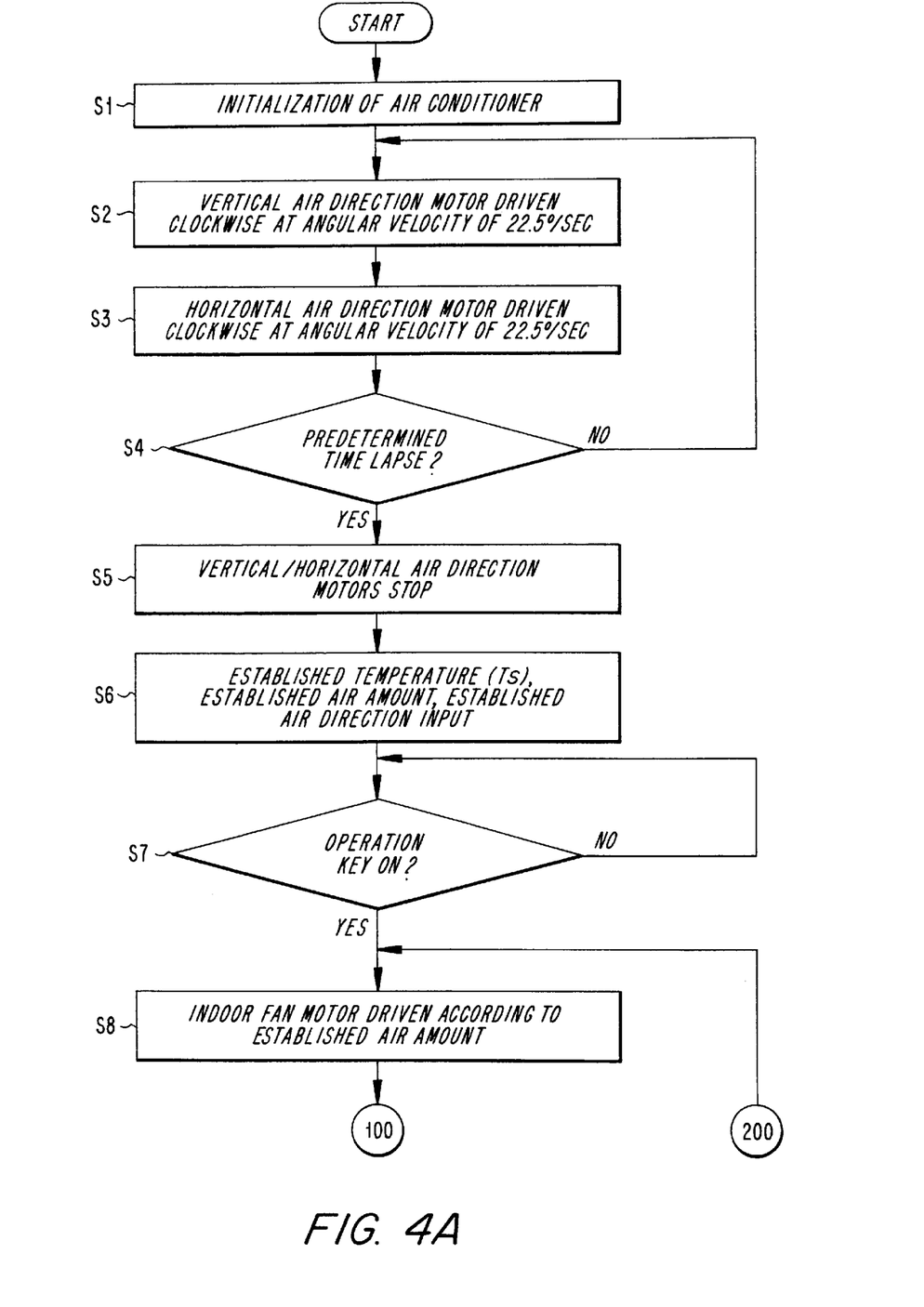
FIGS. 4A and 4B are flow charts illustrating sequential control procedures for a selection of mode for the air conditioner.
Figure 4B:
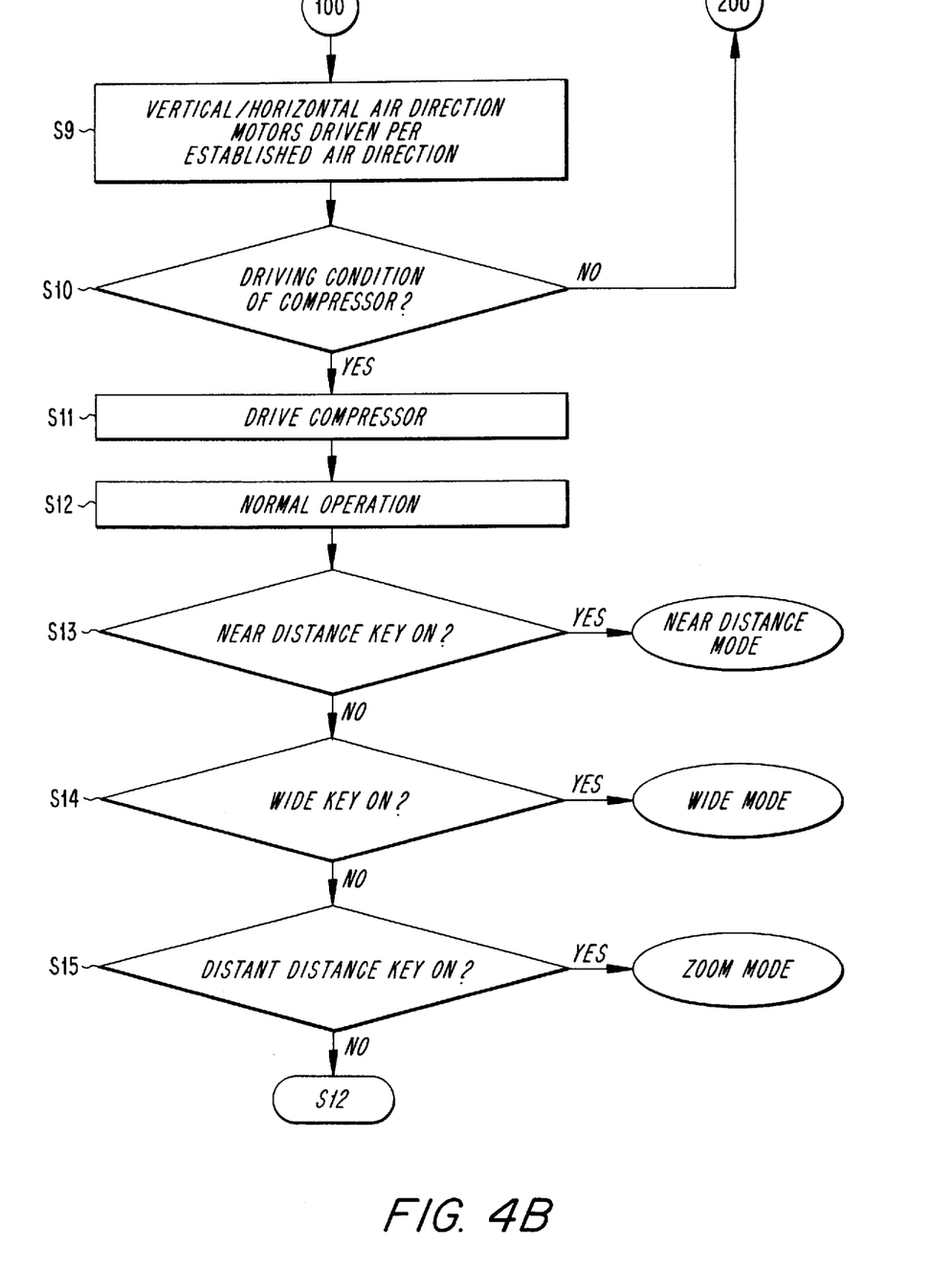

FIGS. 4A and 4B are flow charts illustrating the sequential processing steps for controlling an air current for an air conditioner according to the present invention.

As an electric power is applied to the air conditioner, the control means 104 receives a DC voltage supplied from the power supply means 100 and initializes the air conditioner (S1). A control signal for driving the vertical direction driving motor 113 from the control means 104 is then applied to the vertical direction adjusting portion 112 to return the horizontal blades 9 to their initial, closed state. That is, the vertical direction driving motor 113 driven by the vertical direction adjusting portion 112 rotates clockwise with an angular velocity of 22.5-degree/sec, consequently closing the horizontal blades 9 (S2).

At step S3, the control means 104 outputs to the horizontal direction adjusting portion 114 a control signal for driving a horizontal direction driving motor 115 to return the vertical blades 11 to their initial, closed state. That is, the horizontal direction driving motor 115 driven by the horizontal direction adjusting portion 114 rotates clockwise with an angular velocity of 22.5-degree/sec, consequently closing the horizontal blades 9 (S3).

At step S4, the control means 104 counts a predetermined driving duration such as about 7 seconds for the vertical and horizontal direction driving motors 113, 115. Till the lapse of the predetermined time duration, the steps following step S2 are repeated for completing the closing of both sets of blades 9, 11.

After the lapse of the defined time duration, which implies that both sets of blades 9, 11 have been completely closed, the process goes to step S5 where the vertical and horizontal direction adjusting portions 112, 114 stop both motors 113, 115 under the control of the control means 104 at the completion of the closing operation for both blades 9, 11. wherein this condition will be used as an initial state hereinafter.

The initialization routines from step S2 to S5 are performed for completely closing both blades 9, 11 each time that the air conditioner is turned on, since it is difficult to make an accurate positional control if the blade positions were changed due to an external (e.g., manual) manipulation thereof while the air conditioner was off.

Next at step S6, a desired room temperature Ts for cooling or heating the room, and an amount and blowing direction of the air to be discharged are set at the control means 104 through the operation manipulating means 102. At step S7, it is determined if the start key is on.

Upon the start key being on, the manipulating commands and operating signals from the operation manipulating means 102 are input to the control means 103 which then outputs a control signal to the fan motor driving means 116.

Thus, the fan motor driving means 116 receives the control signal issued from the control means 102 based upon the air amount previously set and drives the indoor fan 23 with a controlled speed of the indoor fan motor 21 (S8).

When the driven indoor fan 23 sucks the room air into the body 1, the room temperature detecting means 106 senses a temperature Tr of the room air sucked through the suction inlet 3 and outputs the result to the control means 104.

Next, at step S9, the control means 104 outputs a control signal to the vertical and horizontal direction adjusting portions 112, 114 for driving the vertical and horizontal direction driving motors 113, 115 so as to adjust the directional angles of the respective blades 9, 11 for guiding the air in compliance with the set air blowing direction.

At step S10, the comparison is made between the room temperature Tr sensed by the room temperature detecting means 106 and the set temperature Ts in order to determine if the respective driving conditions of cooling and heating for the compressor 109 are met. The compressor under a cooling operation is driven when the sensed temperature Tr is higher than the set temperature Ts, and vice versa for a heating operation.

The detection of the room temperature Tr at step S10 continues until the driving condition for the compressor 121 is met, i.e., until the compressor driving means 120 receives a control signal for driving the compressor 121 from the control means 116 which decides the operation frequency for the compressor 121 based upon the difference between the room temperature Tr and the set temperature Ts.

As the driven indoor fan 23 sucks the room air into the body 1 through the suction inlet 3, the sucked air passes through the filter member 17 for filtering out any foreign substances such as dust contained in the room air. The cleaned air is then heat-exchanged by the evaporating latent heat of the refrigerant flowing in the heat-exchanger when the sucked air passes across the heat-exchanger 19 (S12).

The heat-exchanged air is guided to an upper portion of the air conditioner by the duct member 25, and the air blowing direction of the guided air is based upon the set angles of the vertical and horizontal blades 11, 9 disposed at the discharging outlet 7.

The foregoing describes a normal operation of the air conditioner. During such a normal operation, it is determined if a focus key is depressed or not (step S13). If so (in case of YES), the control means 104 enters a near-distance mode for air conditioning areas near to the main body 1.

In case it is determined that a focus key is not depressed (in case of NO), the process goes to step S14 where it is determined if a wide key is depressed or not. If a wide key is input, then the control means 104 performs the air conditioning of an entire room.

At step S14, when the wide key is not depressed (in case of NO), the process advances to step S25 where it is determined if a zoom key is depressed or not. If the zoom key is input (in case of YES), then the control means 104 enters a distant distance mode for air conditioning distant areas.

At step S15, when the zoom key is not depressed (in case of NO), the process returns to step S12, and the steps following step S12 are repeated.

Figure 6A:
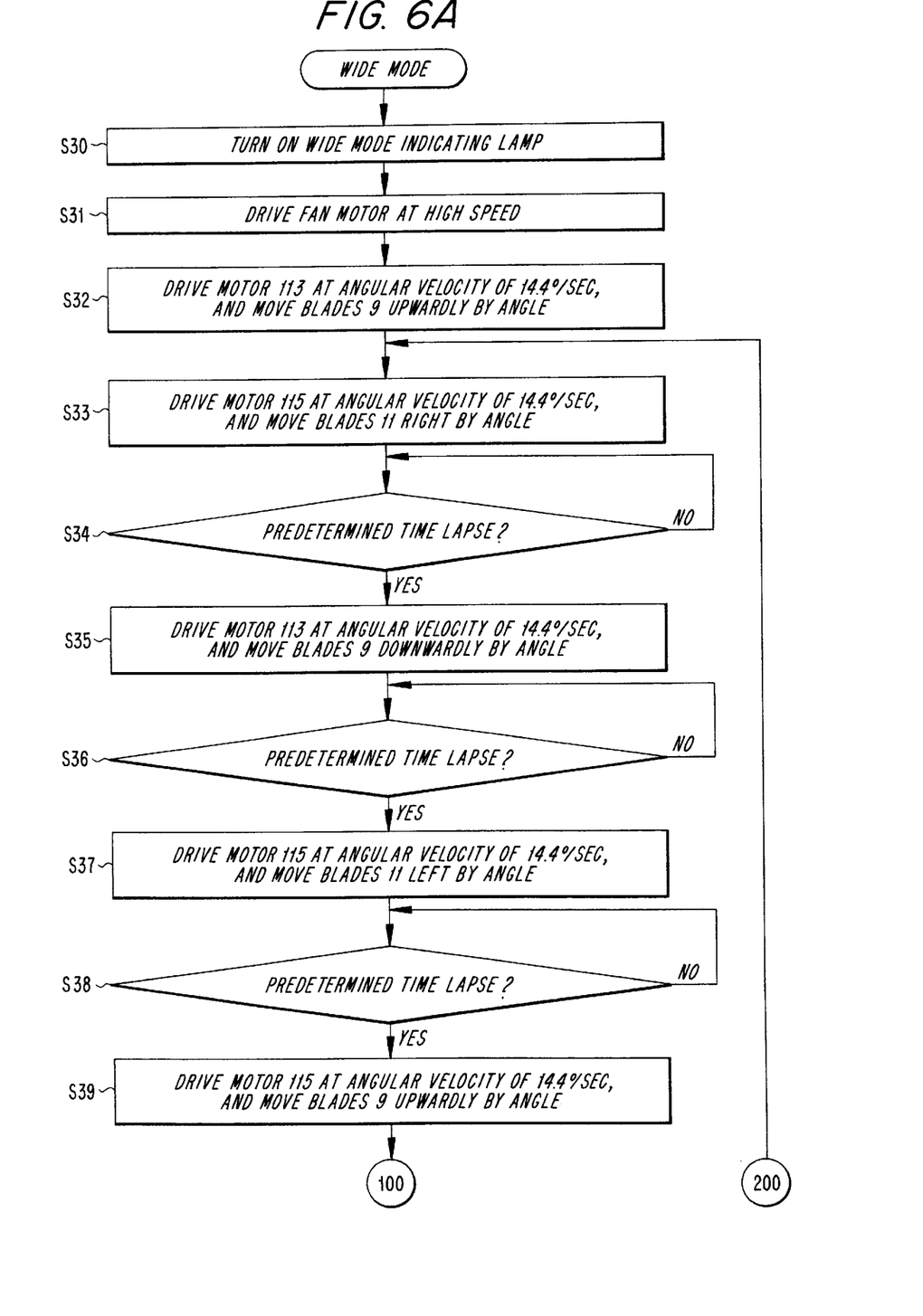
FIGS. 6A and 6B are flow charts illustrating sequential control procedures for a selection of a wide mode for the air conditioner.
Figure 6B:
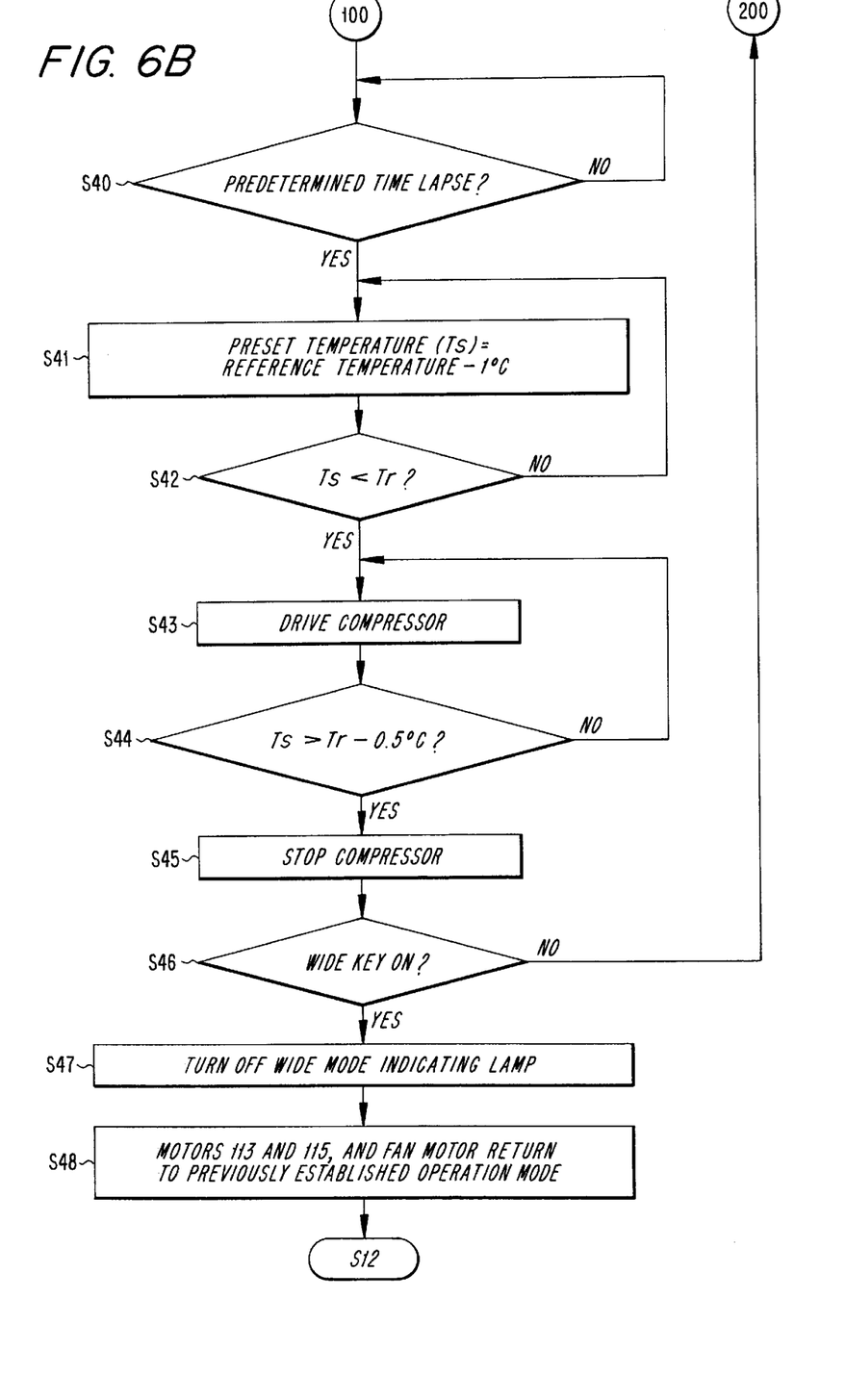
Figure 7A:
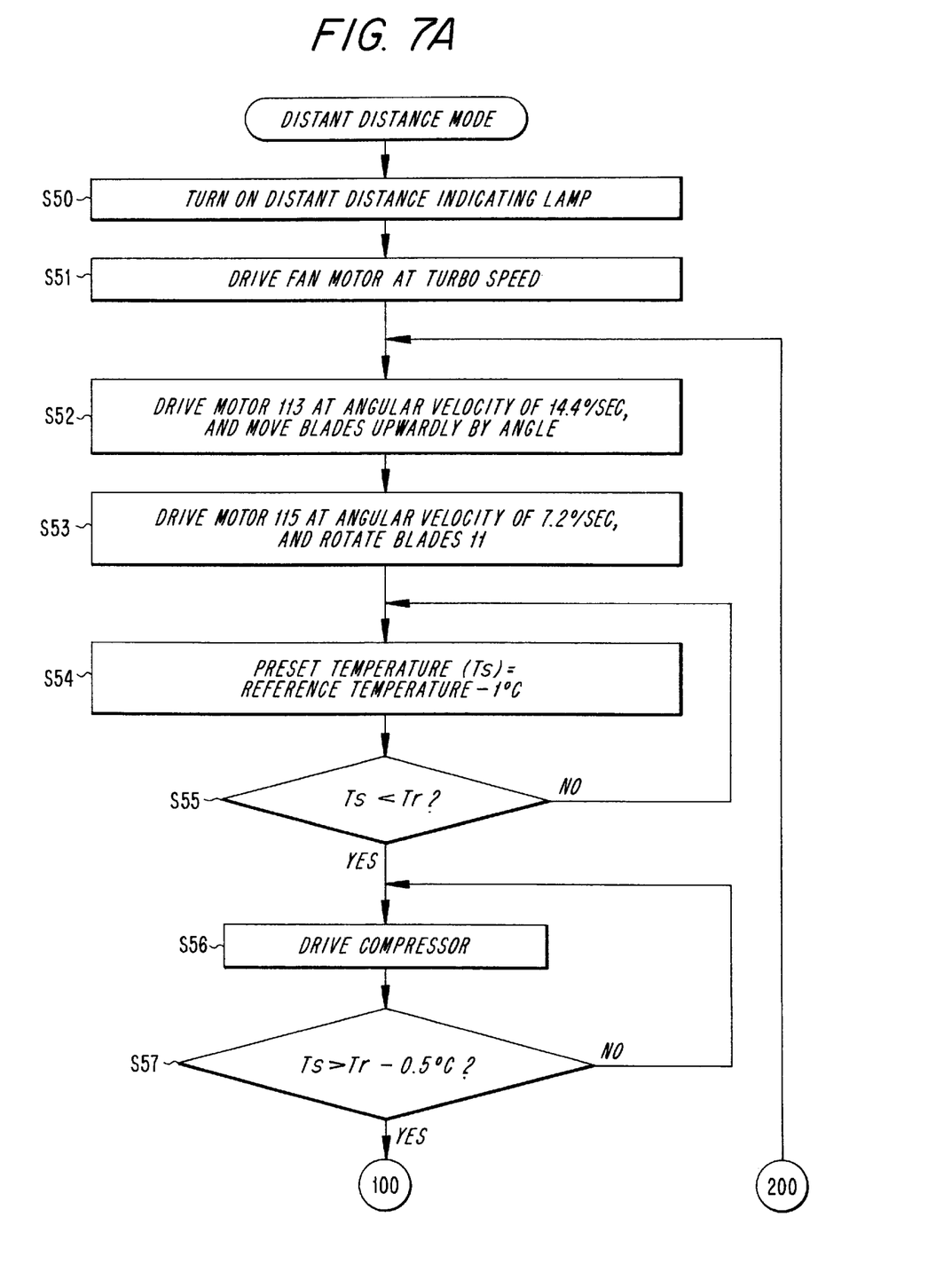
FIGS. 7A and 7B are flow charts illustrating sequential control procedures for a selection of a distant distance mode for the air conditioner.
Figure 7B:
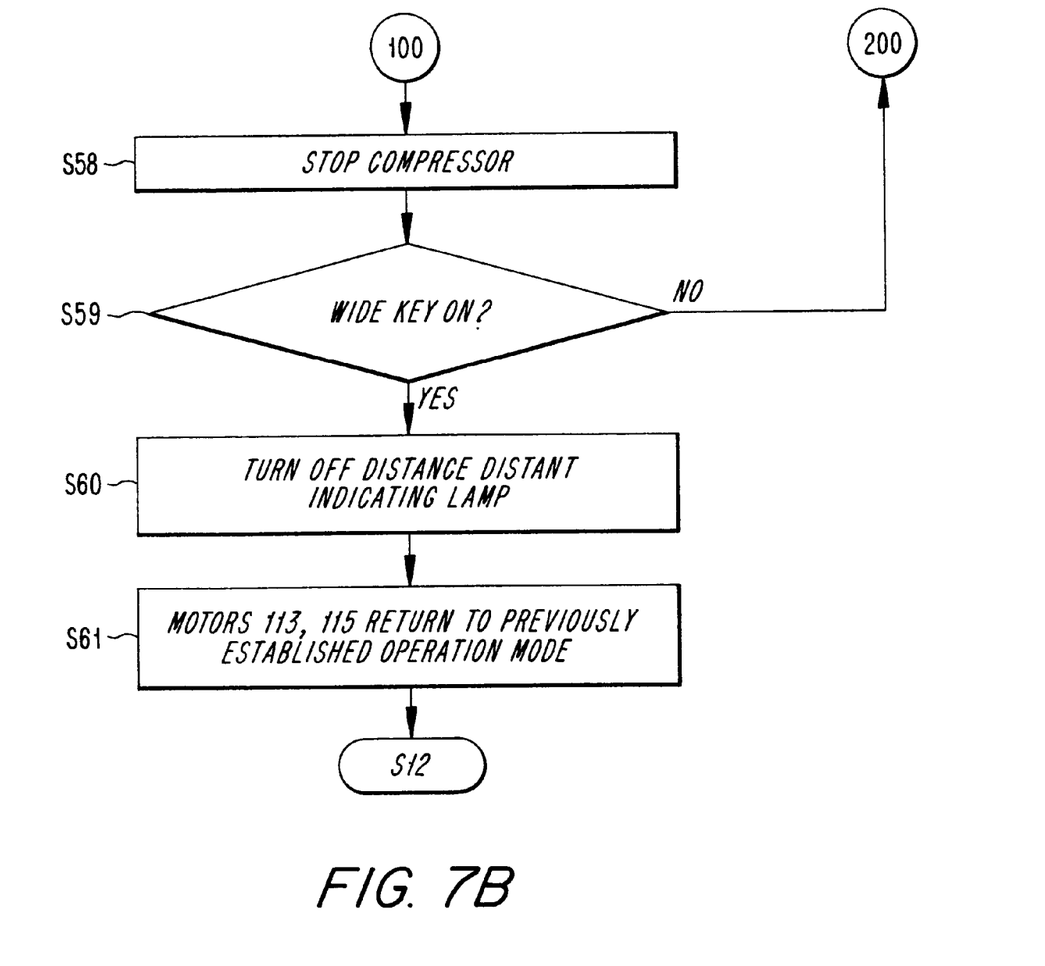

The respective operations of three modes of focus, wide, and zoom will be explained below with reference to FIGS. 5 to 7.

Figure 5:
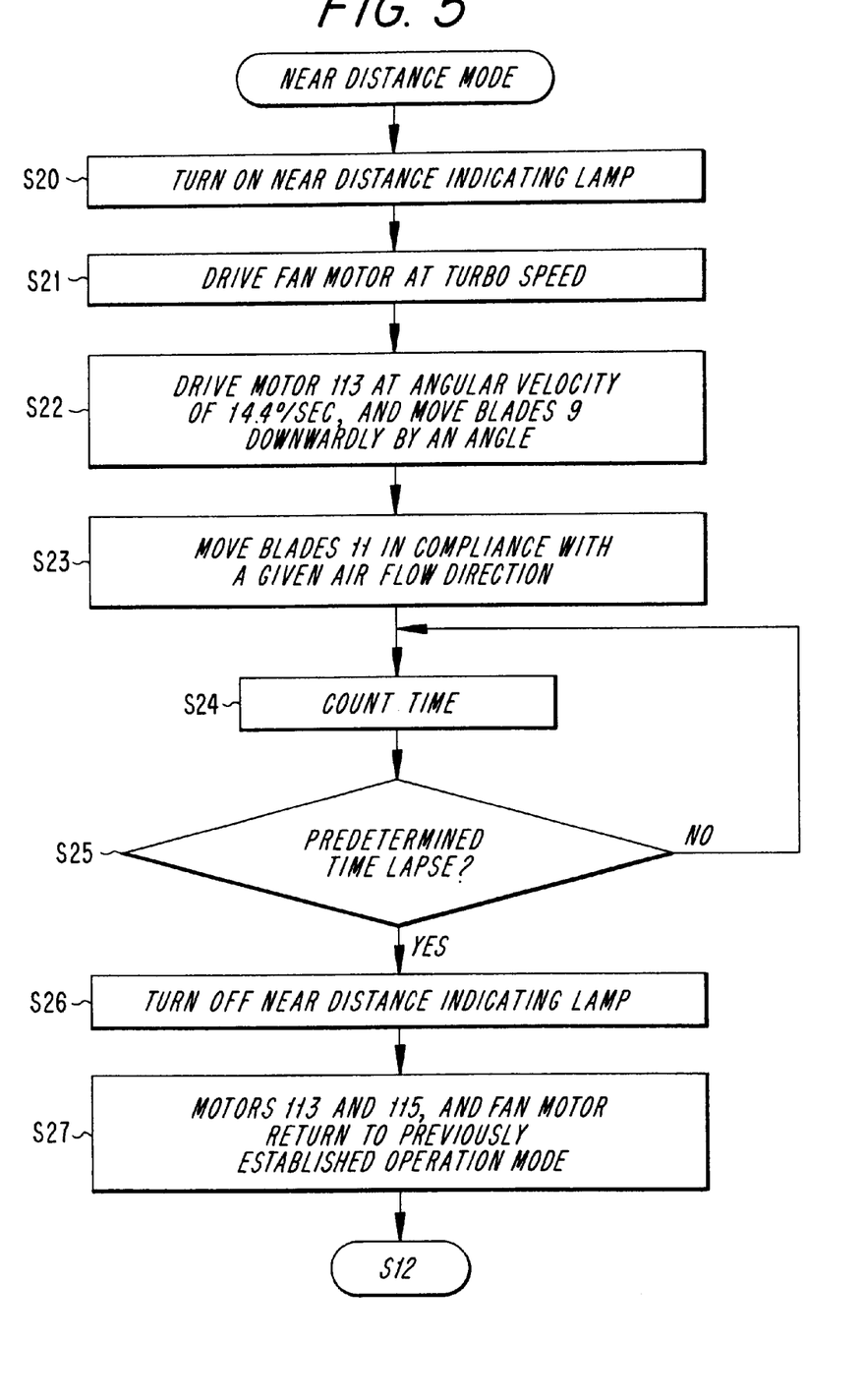
FIG. 5 is a flow chart illustrating sequential control procedures for a selection of a near distance mode for the air conditioner.

Referring to FIG. 5 showing a flow chart for explaining a focus mode operation, when the focus key is depressed to enter the focus mode, the control means 104 controls the display means 118 in order to display a focus mode condition. The display means 118 turns on a near distance indicating lamp representing a near-distance operation mode for conditioning near areas. At step S21, the control means 104 outputs a control signal to the fan motor driving means 116 for driving the indoor fan motor 21, such that the concentrated supply of the discharging air is made near the body 1.

Successively, the fan motor driving means 116 receives a control signal output from the control means 104 to drive the indoor fan motor 21 at a turbo speed (approximately 670 rpm), and at step S22, the control means 104 outputs a control signal to the control means 104 to adjust angles of the horizontal blades 9 so that the discharged air can be concentrated near the body 1.

Figure 8A:
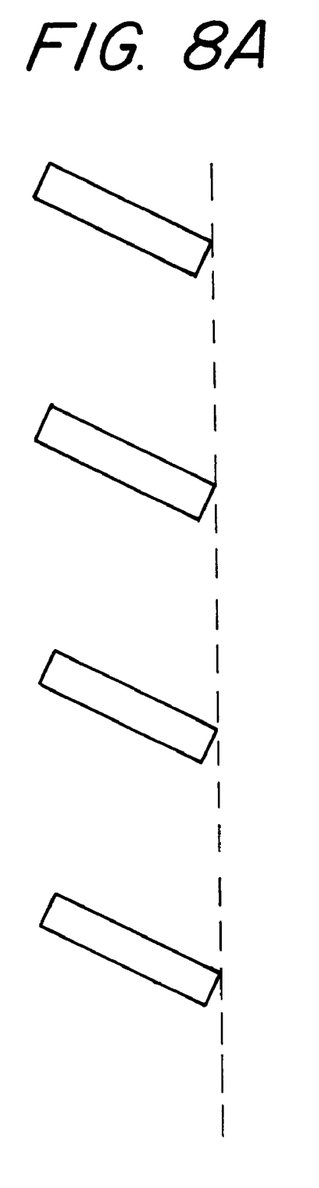
FIG. 8 shows a operational position of horizontal blades as seen along line A—A in FIG. 1.
Figure 8B:
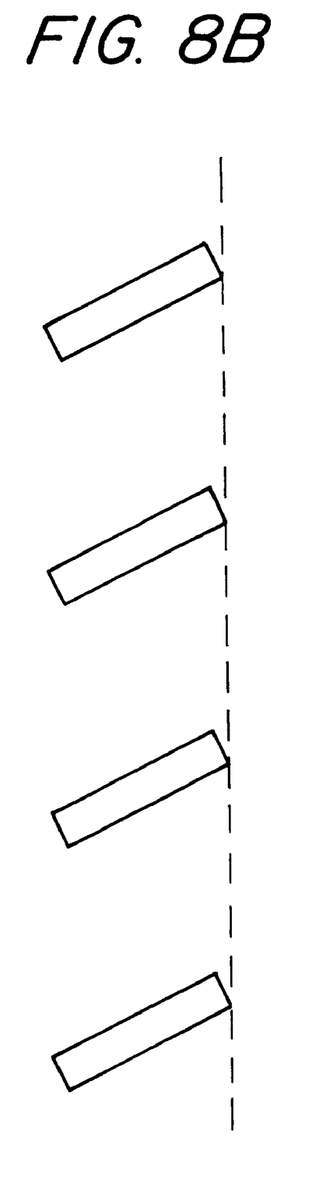

Then, the motor 113 is driven at an angular velocity of 14.4-degrees/sec and moves the horizontal blades 9 downwardly by a predetermined angle of approximately 15-degrees, as illustrated in FIG. 8B, whereupon the motor 113 stops.

Successively, the control means 104 at step S23 outputs a control signal to the horizontal direction adjusting portion 114 to adjust angles of the vertical blades 11 so that the discharged air can be concentrated at the near area of the room.

The horizontal direction adjusting portion 114 receives from the control means 104 a control signal for driving the motor 115, such that the blades 11 is horizontally rotated according to the set air current directions, whereupon the motor 115 stops.

Successively, the room air sucked through the suction inlet 3 is heat-exchanged by evaporative latent heat of the refrigerant flowing in the heat exchanger 19, and the air is moved upward through the duct member 25. The discharged air is concentrated at the near position of the room according to the stationary horizontal blades 9 directed downwards and the vertical blades 11 moved and directed to converge. The air discharged according to the turbo drive of the indoor fan motor 21 is thereby concentrated at a near-distance area.

At this time, at step S24, the control means 104 counts a time period, approximately 30 minutes (the shortest time period during which the concentrated air conditioning can be achieved)at which the blades 9 are fixed at the predetermined angle downwards and the blades 11 are horizontally moved, and, at step S25, determines whether the predetermined time period has lapsed. If the predetermined time has not lapsed (in case of NO), operations are repeated subsequent to step S24 until the predetermined time period lapses.

At step S25, if it is determined that the predetermined time period has lapsed (in case of YES), it is determined that the concentrated air conditioning as a user desired is accomplished within the shortest time period, and then flow goes to step S26, where the control means 104 outputs to the display means 118 a control signal for indicating a stop of near operation.

At step S27, the motors 113 and 115 return to a cooling or heating operation mode previously established prior to the selection of the near mode and performs continuously the normal operation at step S12 and executes repeated operations subsequent to step S12.

Next, a control operation of the wide mode will be described with reference to FIG. 6A and 6B.

When an air conditioner enters a wide mode in response to the wide key being actuated, at step S30, the control means 104 generates to the display means 118 a control signal for displaying a wide operation state of the air conditioner. Then, the display means 118 turns on a wide mode indicating lamp to thereby display a wide operation state.

At step S31, the control means 104 outputs to the fan motor driving means 116 a control signal for rotating the fan motor 21 at high speed so that the discharged air can be evenly and widely spread to the entire area of the room.

At step S32, the control means 104 outputs to the vertical direction adjusting portion 112 a control signal for adjusting the angles of the horizontal blades 9 such that the discharged air can be evenly and widely spread to the entire area of the room.

The vertical direction adjusting portion 112 receives the control signal output from the control means 104 to thereby drive the motor 113 at an angular velocity of 14.4-degrees/sec to tilt the blades 9 at a predetermined angle (approximately 30 degrees) upward as illustrated in FIG. 8A, whereupon the motor 113 stops.

Next, at step S33, the control means 104 outputs to the horizontal direction adjusting portion 114 a control signal for adjusting the angles of the is vertical blades 11 such that the discharged air can be evenly and widely spread to the entire area of the room.

Figure 9A:
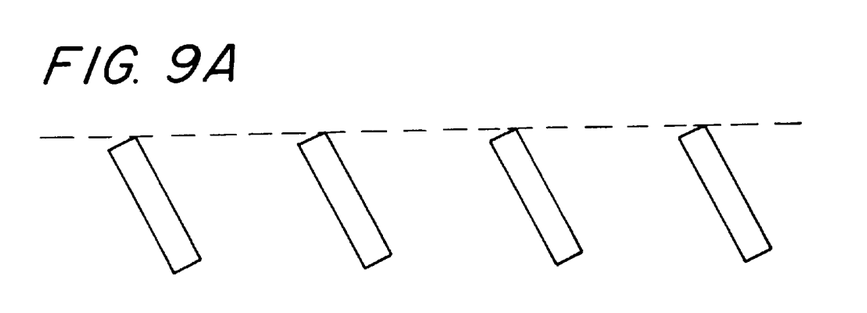
FIG. 9 shows a operational position of vertical blades as seen along line B—B in FIG. 1.

The horizontal direction adjusting portion 114 receives the control signal output from the control means 104 to drive the motor 115 at an angular velocity of 14.4-degrees/sec to tilt the blades 11 at a predetermined angle (approximately 15-degrees) to the right as illustrated in FIG. 9A, whereupon the motor 115 stops.

At this time, at step S34, the control means 104 counts a time period, approximately 20 seconds at which the blades 9 are fixed at the predetermined angle upwards and the blades 11 are fixed at the predetermined angle to the right, and determines whether the predetermined time period has lapsed. If the predetermined time has not lapsed (in case of NO), operations are repeated subsequent to step S34 until the predetermined time period lapses.

As a result of the determination at step S34, if the predetermined time period has lapsed (in case of YES), flow advances to step S35, where the vertical direction adjusting portion 112 drives the motor 113 at an angular velocity of 14.4-degrees/sec according to the control of the control means 104 to thereby tilt the blades 9 to a downward position as illustrated in FIG. SB, whereupon the motor 115 stops.

At this time, with the blades 11 fixed at the predetermined angle of about 30-degrees to the right, only the blades 9 are moved downwards by about 30-degrees, so that the discharging air flow is directed right and downward.

At step S36, the control means 104 determines whether the time period at which the blades 9 and 11 are fixed in the downward and right positions, respectively, has passed the predetermined time period (approximately 20 seconds), and if not (in case of NO), operations are repeated subsequent to step S36 until the predetermined time period lapses.

Figure 9B:
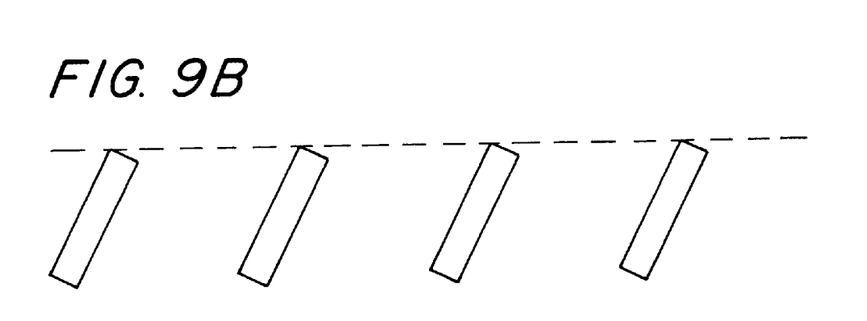

As a result of the determination at step S36, if the predetermined time period has lapsed (in case of YES), flow advances to step S37, where the horizontal direction adjusting portion 114 drives the motor 115 at an angular velocity of 14.4-degrees/sec according to the control of the control means 104 to thereby tilt the blades 11 to a left position as illustrated in FIG. 9B, whereupon the motor 115 stops.

At this time, with the blades 9 fixed at the predetermined angle of about 30-degrees downwards, only the blades 11 are moved to the left by about 30-degrees, so that the discharging air flow is directed left and downward.

At step S38, the control means 104 determines whether the time period at which the blades 9 and 11 are fixed in the downward and left positions, respectively, has passed the predetermined time period (approximately 20 seconds), and if not (in case of NO), operations are repeated subsequent to step S38 until the predetermined time period lapses.

As a result of the determination at step S38, if the predetermined time period has lapsed (in case of YES), flow advances to step S39, where the vertical direction adjusting portion 112 drives the motor 113 at an angular velocity of 14.4-degrees/sec according to the control of the control means 104 to thereby tilt the blades 11 to a upward position as illustrated in FIG. 8A, whereupon the motor 113 stops.

At this time, with the blades 11 fixed at the predetermined angle of about 30-degrees to the left, only the blades 9 are moved upwards by about 30-degrees, so that the discharging air flow is directed left and upward.

At step S40, the control means 104 determines whether the time period at which the blades 9 and 11 are fixed in the upward and left positions, respectively, has passed the predetermined time period (approximately 20 seconds), and if not (in case of NO), operations are repeated subsequent to step S38 until the predetermined time period lapses.

As a result of the determination at step S40, if the predetermined time period has lapsed (in case of YES), flow advances to step S41, where the control means 104 uses a new reference temperature lower by one-degree than the preset temperature Ts, wherein the reference temperature implies a temperature at which a user feels most pleasant, which may be obtained by the chaos operations made based upon indoor an humidity amount and variation of room temperature changed by the outdoor temperature.

When a user feels hot or cold at the preset temperature, temperature is adjusted only within a range of 2-degrees to -2-degrees about the reference temperature.

Next, at step S42, the room temperature detecting means 106 senses a temperature Tr of the room air sucked through the suction inlet 3 and outputs the result to the control means 104 that determines whether the preset temperature Ts is lower than that of the room temperature Tr.

This shows the exemplary procedure when the wide key is actuated at the cooling operation, but in case the wide key is actuated at the heating operation, it is determined whether the preset temperature Ts is higher than that of the room temperature Tr.

At step S42, the comparison is made between the room temperature Tr and the preset temperature Ts. If the preset temperature Ts is higher than that of the room temperature Tr (in case of NO), flow returns to step S41 where the detection of the room temperature Tr continues and operations are repeated subsequent to step S41. However, if the preset temperature Ts is lower that that of the room temperature Tr (in case of YES), the process goes to step S43, where the compressor driving means 108 receives a control signal for driving the compressor 109 from the control means 116 which decides the operation frequency for the compressor 109 based upon the difference between the room temperature Tr and the set temperature Ts.

As the indoor fan 23 driven by the activated compressor 109 sucks the room air into the body 1 through the suction inlet 3, the sucked air passes through the filter member 17 for filtering out any foreign substances such as dust contained in the room air. The cleaned air is then heat-exchanged by the evaporating latent heat of the refrigerant flowing in the heat-exchanger 19 when the sucked air passes across the heat-exchanger 19.

The heat-exchanged air is guided to an upper portion of the air conditioner by the duct member 25, and the air blowing direction of the guided air is based upon the set angles of the vertical and horizontal blades 11, 9 disposed at the discharging outlet 7.

At this time, it is determined whether the preset temperature Ts is higher than a temperature, Tr-0.5 degrees, obtained by subtracting 0.5-degrees from the room temperature Tr, if not (in case of NO), flow returns to step S43 where operations are repeated subsequent to step S43. However, if the preset temperature Ts is higher than Tr-0.5 degrees (in case of YES), it is determined that the current temperature is a temperature at which a user feels most pleasant, and then flow advances to step S45 where the compressor driving means 108 stops the compressor 109 under the control of the control means 104.

Next, at step S46, it is again determined whether the wide key is actuated or not. If not (in case of NO), flow returns to step S33.

Thus, the room air sucked through the suction inlet 3 is heat-exchanged by evaporative latent heat of the refrigerant flowing in the heat exchanger 19, and the air is moved upward through the duct member 25.

At this time, the discharged air can be evenly and widely spread to the entire area of the room by moving the blades 9 and 11 by predetermined angles upward and right, downward and right, downward and left, and upward and left, at a constant time interval. Further, with the reference temperature, the preset temperature Ts is controlled to be varied. Accordingly, the pleasant room temperature throughout the room can be maintained.

At step S46, a determination is made as to whether the wide key is actuated. When the key actuated, a key signal corresponding to a stop of wide operation mode is output to the control means 104 from the operation manipulating means 102. Thus, to stop the wide operation mode, flow goes to step S47, where the control means 104 outputs to the display means 118 a control signal for indicating the wide operation stop.

At step S48, the motors 113 and 115 return to a cooling or heating operation mode previously established prior to the selection of the wide mode and performs continuously the normal operation at step S12 and executes repeated operations subsequent to step S12.

Next, the control process related to the distant distance mode will be described below with reference to FIGS. 7A and 7B.

When the zoom key is depressed to enter the zoom mode, the control means 104 controls the display means 118 in order to display a distant distance mode condition. The display means 118 turns on a distant distance indicating lamp representing a distant distance operation mode for conditioning distant areas. At step S51, the control means 104 outputs a control signal to the fan motor driving means 116 for driving the indoor fan motor 21, such that the discharging air is supplied to the distant distance from the body 1.

Successively, the fan motor driving means 116 receives a control signal output from the control means 104 to drive the indoor fan motor 21 at a turbo speed (approximately 670 rpm), and at step S52, the control means 104 outputs a control signal to the control means 104 to adjust angles of the horizontal blades 9 so that the discharged air can reach a distant distance area.

Then, the motor 113 is driven at an angular velocity of 14.4-degrees/sec and moves the horizontal blades 9 upwardly by a predetermined angle of approximately 15-degrees, as illustrated in FIG. 8A, whereupon the motor 113 stops.

Successively, the control means 104 at step S53 outputs a control signal to the horizontal direction adjusting portion 114 to adjust angles of the vertical blades 11 so that the discharged air can reach the distant area of the room.

Figure 9C:
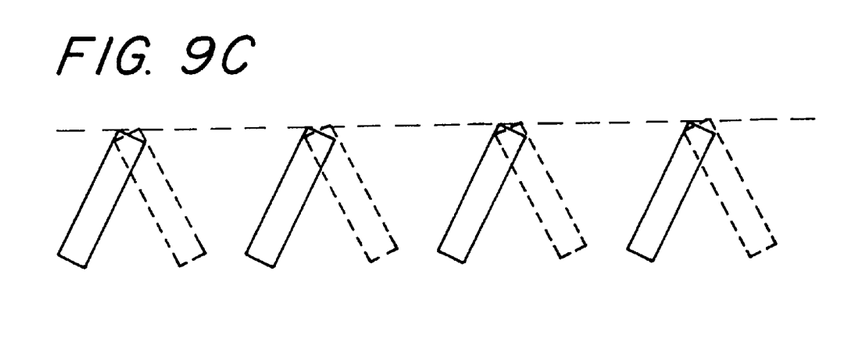

That is, the horizontal direction adjusting portion 114 drives the vertical direction driving motor 115 at an angular velocity of 7.2-degrees/sec, such that as shown in FIG. 9C, the vertical blades 11 are rotated horizontally by a predetermined angle of 30-degrees.

At step S54, the control means 104 uses a new reference temperature lower by one-degree than the preset temperature Ts, wherein the reference temperature implies, as in the wide mode earlier described, a temperature at which a user feels most pleasant, which may be obtained by the chaos operations made based upon indoor an humidity amount and variation of room temperature changed by the outdoor temperature.

Next, at step S55, the room temperature detecting means 106 senses a temperature Tr of the room air sucked through the suction inlet 3 and outputs the result to the control means 104 that determines whether the preset temperature Ts is lower than that of the room temperature Tr.

At step S55, the comparison is made between the room temperature Tr and the preset temperature Ts. If the preset temperature Ts is higher than that of the room temperature Tr (in case of NO), flow returns to step S54 where the detection of the room temperature Tr continues and operations are repeated subsequent to step S54. However, if the preset temperature Ts is lower than that of the room temperature Tr (in case of YES), the process goes to step S56, where the compressor driving means 108 receives a control signal for driving the compressor 109 from the control means 104 which decides the operation frequency for the compressor 109 based upon the difference between the room temperature Tr and the set temperature Ts.

As the indoor fan 23 driven by the activated compressor 109 sucks the room air into the body 1 through the suction inlet 3, the sucked air passes through the filter member 17 for filtering out any foreign substances such as dust contained in the room air. The cleaned air is then heat-exchanged by the evaporating latent heat of the refrigerant flowing in the heat-exchanger 19 when the sucked air passes across the heat-exchanger 19.

The heat-exchanged air is guided to an upper portion of the air conditioner by the duct member 25, and the air blowing direction of the guided air is based upon the set angles of the vertical and horizontal blades 11, 9 disposed at the discharging outlet 7.

At this time, it is determined whether the preset temperature Ts is higher than a temperature, Tr-0.5 degrees, obtained by subtracting 0.5-degrees from the room temperature Tr, if not (in case of NO), flow returns to step S56 where operations are repeated subsequent to step S56. However, if the preset temperature Ts is higher than Tr-0.5 degrees (in case of YES), it is determined that the current temperature is a temperature at which a user feels most pleasant at his distant distance, and then flow advances to step S58 where the compressor driving means 108 stops the compressor 109 under the control of the control means 104.

Next, at step S59, it is again determined whether the wide key is actuated or not. If not (in case of NO), flow returns to step S52.

Thus, the room air sucked through the suction inlet 3 is heat-exchanged by evaporative latent heat of the refrigerant flowing in the heat exchanger 19, and the air is moved upward through the duct member 25.

At this time, the discharged air can reach a distant distance by moving the blades 9 by predetermined angles upward, by continuously rotating the blades 11 within a given range. Further, with the reference temperature, the preset temperature Ts is controlled to be varied. Accordingly, the pleasant room temperature about a distant distance can be maintained.

At step S59, a determination is made as to whether the wide key is actuated. When the key actuated, a key signal corresponding to a stop of wide operation mode is output to the control means 104 from the operation manipulating means 102. Thus, to stop the wide operation mode, flow goes to step S60, where the control means 104 outputs to the display means 118 a control signal for indicating the wide operation stop.

At step S61, the motors 113 and 115 return to a cooling or heating operation mode previously established prior to the selection of the wide mode and performs continuously the normal operation at step S12 and executes repeated operations subsequent to step S12.

As is apparent from the foregoing, there is an advantage in the discharged air current control apparatus of an air conditioner and a method thereof according to the present invention, in that a direction and an amount of discharged air can be adjusted according to a simple key manipulation to thereby increase the air conditioning effect of an entire room.

What is claimed is:

1. A method of controlling a flow direction of air discharged form an air outlet of an air conditioner into a room, the air conditioner comprising a suction inlet for sucking indoor air, a heat exchanger for heat-exchanging said indoor air sucked through said suction inlet, a discharge outlet for discharging the air heat-exchanged by said heat exchanger, a plurality of adjustable horizontal blades and adjustable vertical blades for controlling a wind direction of the air discharged through said discharge outlet, a variable-speed indoor fan for controlling a wind amount of the air discharged through said discharge outlet, and an operation mode selector for enabling a user to choose a room area to be air conditioned, the operation mode selector providing a choice of one of only three room areas consisting of: a near distance located proximate to the air conditioner, a wide distance covering substantially an entire area of the room, and a distant distance located remotely of the air conditioner, the method comprising the steps of:

A) determining whether a near distance operation is selected,
   A1) fixing the horizontal blades at a downward angle, oscillating the vertical blades side-to-side, and driving the fan at a first speed such that the discharging air is concentrated at the near distance, if the near distance operation is selected;
B) determining whether a wide distance operation is selected,
   B1) oscillating the vertical blades side-to-side, oscillating the horizontal blades up-and-down, and driving the fan at a second speed such that the discharging air is distributed throughout the room, if the wide distance operation is selected;
C) determining whether a distant distance operation is selected,
   C1) fixing the horizontal blades at an upward angle, oscillating the vertical blades side-to-side, and driving the fan at the first speed such that the discharging air reaches the distant distance, if the distant distance operation is selected.

* * * * *